United States Patent [19]
Bernard, Jr.

[11] Patent Number: 4,781,881
[45] Date of Patent: Nov. 1, 1988

[54] APPARATUS AND METHOD FOR CLOSED-LOOP CONTROL OF REACTOR POWER IN MINIMUM TIME

[76] Inventor: John A. Bernard, Jr., 72 Paul Revere Rd., Needham Heights, Mass. 02194

[21] Appl. No.: 472

[22] Filed: Jan. 5, 1987

[51] Int. Cl.$^4$ .............................................. G21C 7/30
[52] U.S. Cl. ...................................... 376/216; 376/219
[58] Field of Search ................ 376/215, 216, 217, 219

[56] References Cited

U.S. PATENT DOCUMENTS

4,637,911  1/1987  Bernard ............................... 376/217
4,710,341  12/1987  Bernard et al. ...................... 376/216

OTHER PUBLICATIONS

Monta, K., "Time Optimal Control of Nuclear Reactors (III)," Journal of Nuclear Science and Technology, vol. 9-2, Feb. 1967, pp. 51-62.

Lipinski, W. C. et al., "Simulation of the Treat-Upgrade Automatic Reactor Control System", IEEE Nuclear Science Symposium, 1984.

Frogner, B. et al., "Estimation and Optimal Feedback Control Theory Applied to a Nuclear Boiling Water Reactor", Nuclear Science and Engineering: 58, 265-277, (1975).

Naser, Joseph A. et al., "An Efficient Solution Method for Optimal Control of Nuclear Systems", Nuclear Science and Engineering: 79, 99-109 (1981).

Primary Examiner—Charles T. Jordan
Assistant Examiner—Richard Klein

[57] ABSTRACT

Closed-loop control law for altering the power level of nuclear reactors in a safe manner and without overshoot and in minimum time. Apparatus is provided for moving a fast-acting control element such as a control rod or a control drum for altering the nuclear reactor power level. A computer computes at short time intervals either the function:

$$\dot{\rho} = (\bar{\beta} - \rho)\omega - \lambda_e'\rho - \Sigma \bar{\beta}_i(\lambda_i - \lambda_e') + l^* \dot{\omega} + l^* [\omega^2 + \lambda_e'\omega]$$

or the function:

$$\dot{\rho} = (\bar{\beta} - \rho)\omega - \lambda_e\rho - (\dot{\lambda}_e/\lambda_e)(\bar{\beta} - \rho) + l^* \dot{\omega} + l^* [\omega^2 + \lambda_e\omega - (\dot{\lambda}_e/\lambda_e)\omega]$$

These functions each specify the rate of change of reactivity that is necessary to achieve a specified rate of change of reactor power. The direction and speed of motion of the control element is altered so as to provide the rate of reactivity change calculated using either or both of these functions thereby resulting in the attainment of a new power level without overshoot and in minimum time. These functions are computed at intervals of approximately 0.01–1.0 seconds depending on the specific application.

36 Claims, 6 Drawing Sheets

SCHEMATIC OF ALTERNATE CONSTANT PERIOD CONTROL LAW

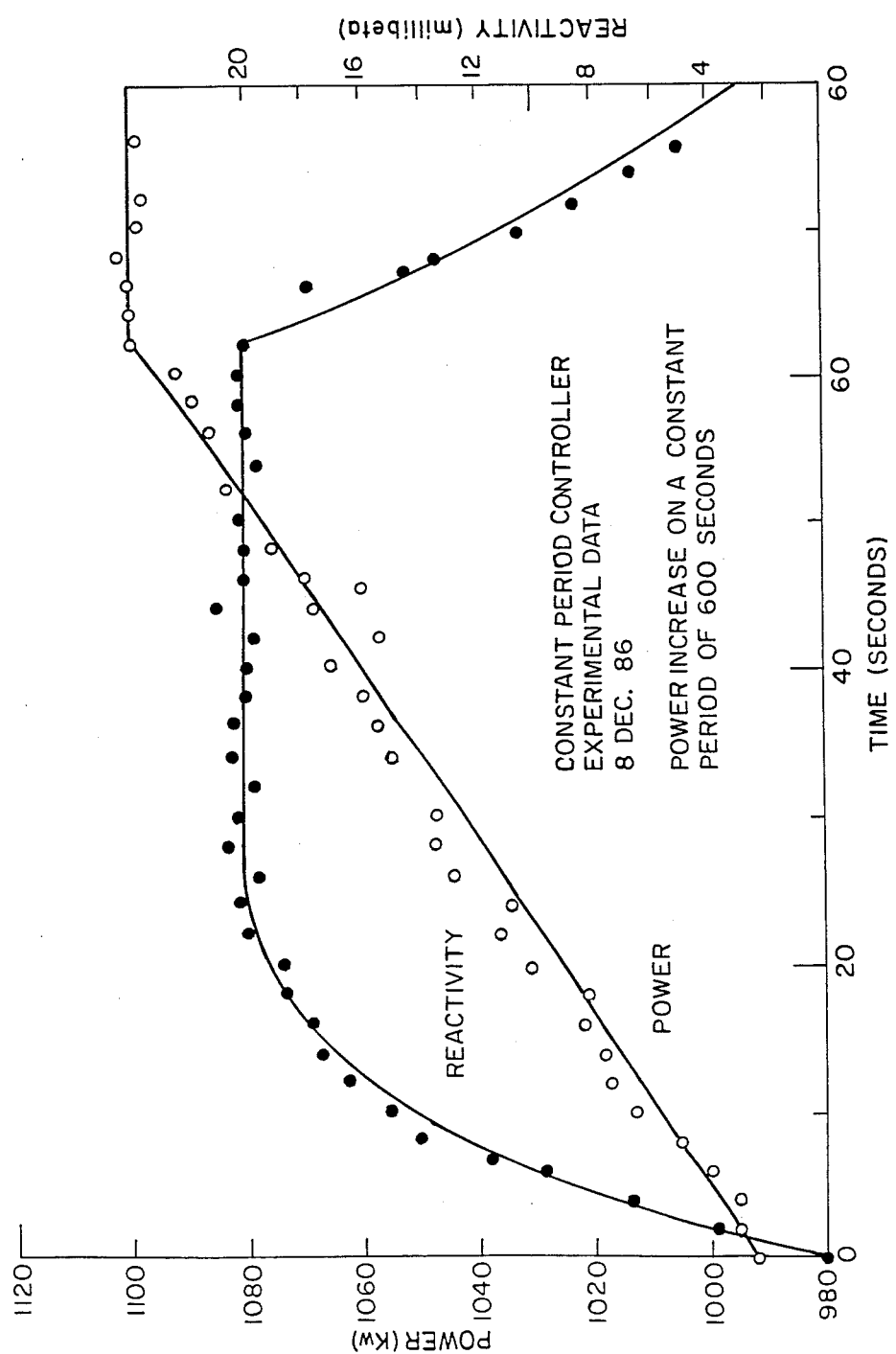
FIG. 1: DEMONSTRATION OF CONSTANT PERIOD CONTROL LAW

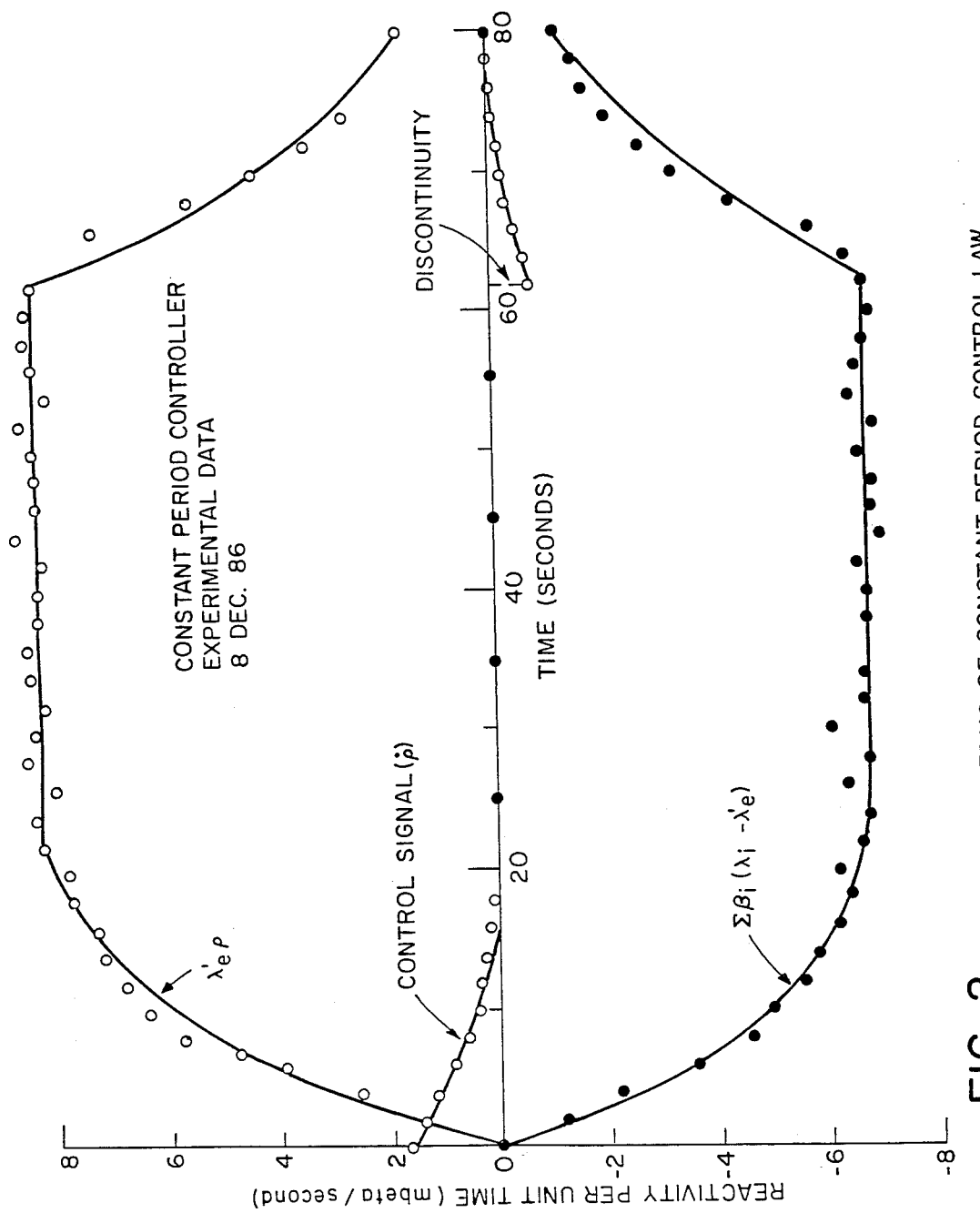
FIG. 2: COMPONENT TERMS OF CONSTANT PERIOD CONTROL LAW

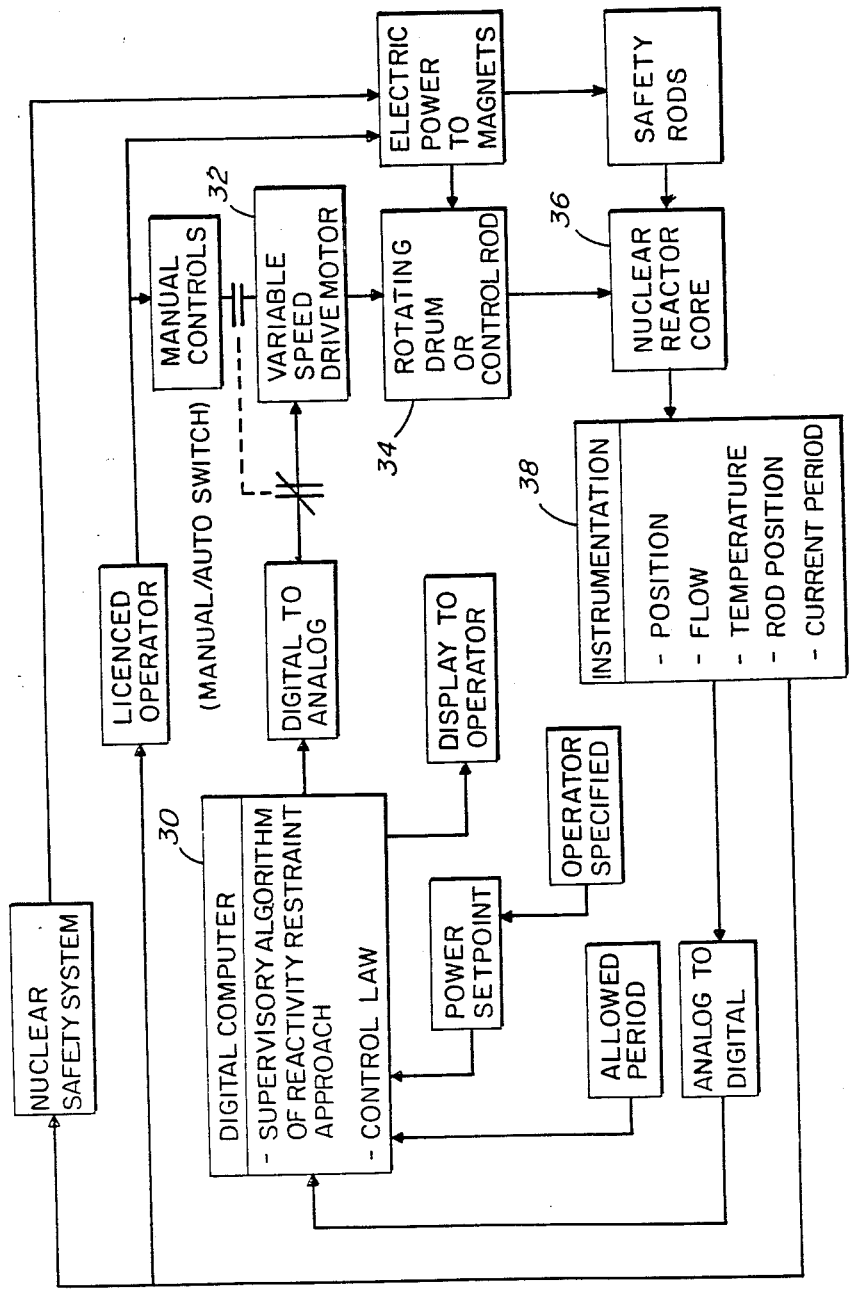
FIG. 3: SCHEMATIC ILLUSTRATION OF A PHYSICAL IMPLEMENTATION OF THE CONTROL LAW

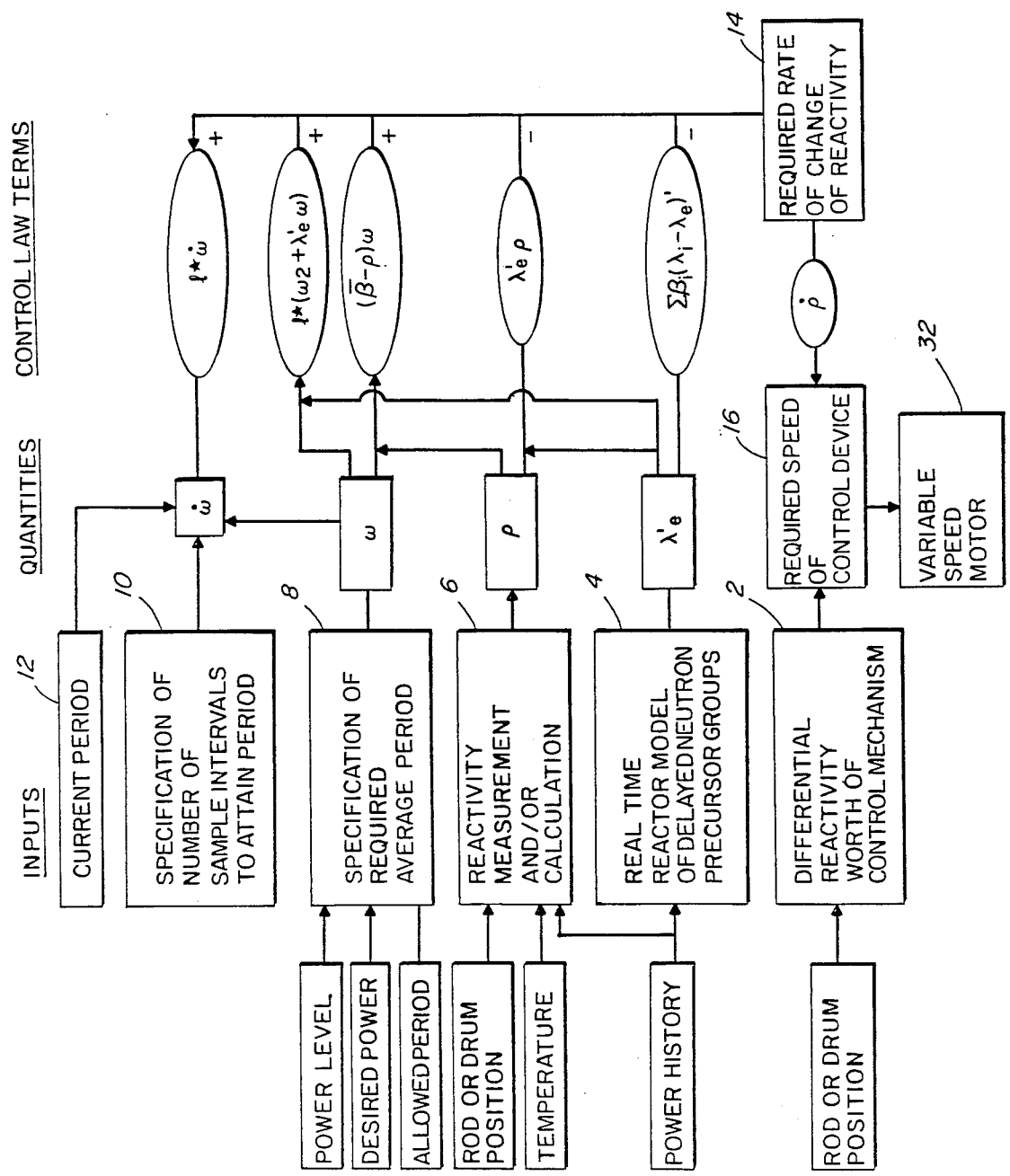
FIG. 4A: SCHEMATIC OF ALTERNATE CONSTANT PERIOD CONTROL LAW

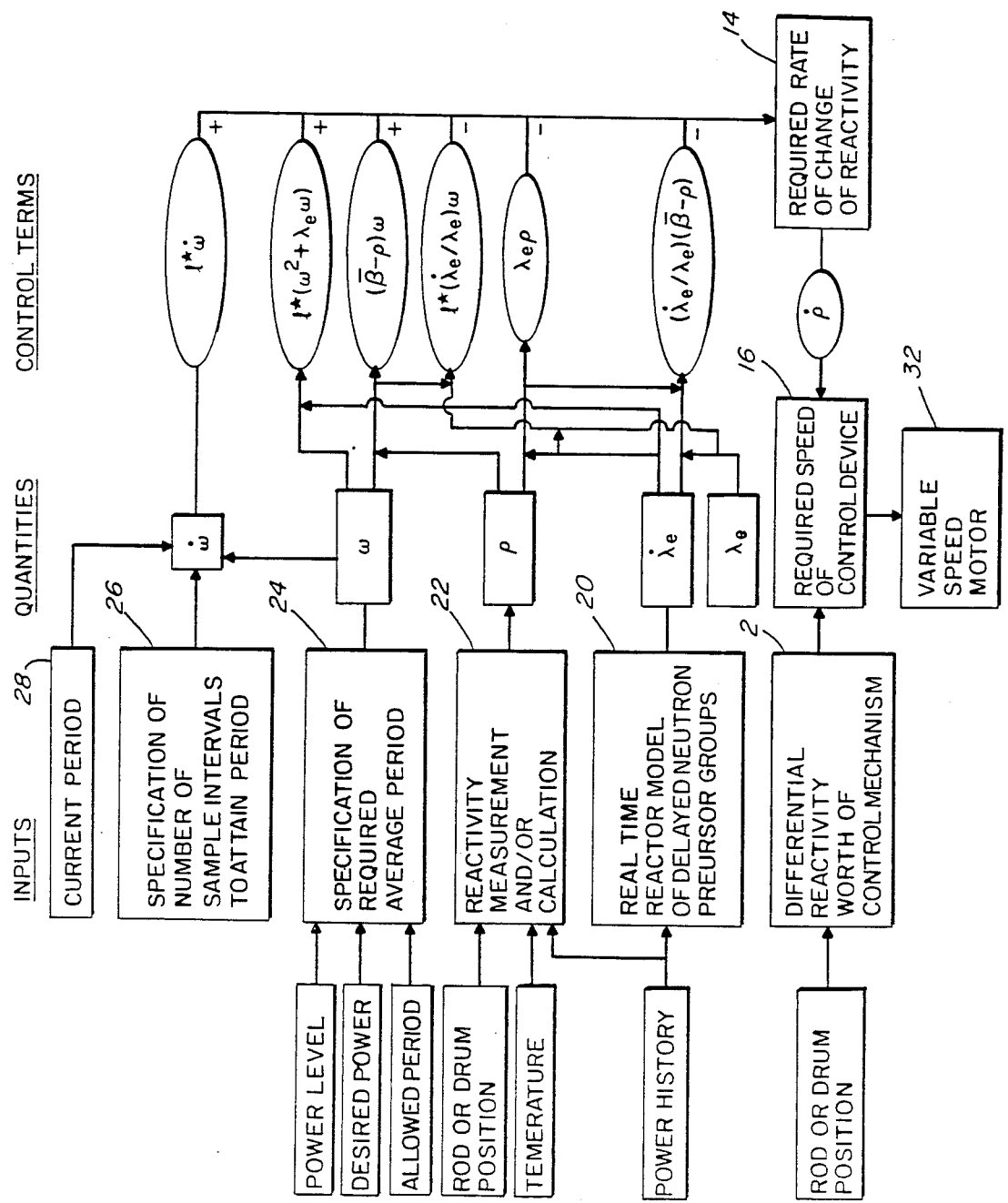
FIG. 4B: SCHEMATIC OF STANDARD CONSTANT PERIOD CONTROL LAW

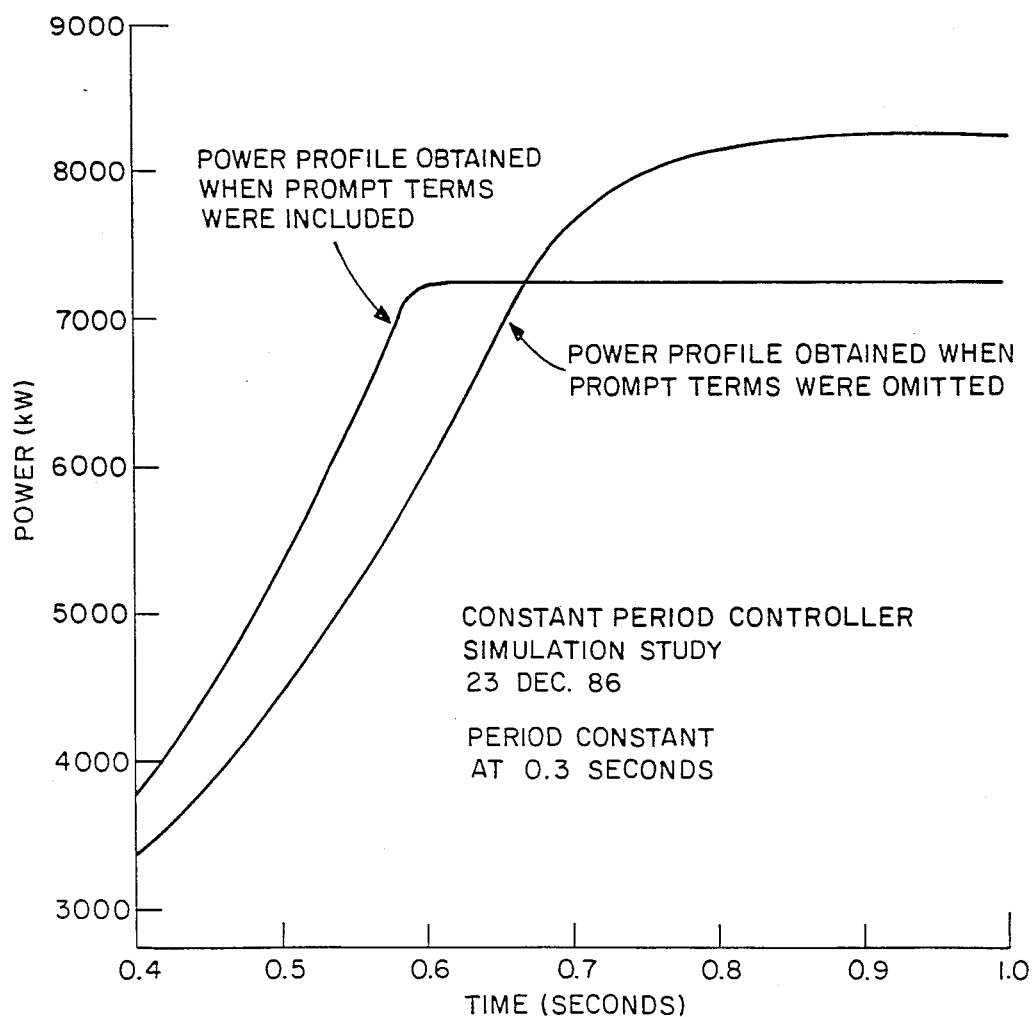
FIG. 5: IMPORTANCE OF INCLUSION OF PROMPT EFFECTS

APPARATUS AND METHOD FOR CLOSED-LOOP CONTROL OF REACTOR POWER IN MINIMUM TIME

The Government has rights in this invention pursuant to Department of Energy Contract No. 01-2763.

BACKGROUND OF THE INVENTION

This invention relates to the control of nuclear reactors and more particularly to the closed-loop control of reactor power.

To change the steady state power level of a nuclear reactor, neutron-absorbing control elements such as control rods or shim blades are moved in and out of the rector core. Also, certain soluble chemicals may be used as the control element. Also, rotating drums may be used as the control elements. For example, to increase the power of a nuclear reactor, the control rods are moved outwardly so that the neutron population can build up to a level consistent with the higher output level. Once the population has increased to the suitable level, the control rods are reinserted to their original position less the impact of feedback effects such as temperature and voids on the reactor's neutron population. Alternatively, if chemical poisons were being used, the concentration of the chemical would be decreased, the power allowed to rise, and the concentration then restored to its initial value less feedback effects. Alternatively, if rotating drums were being used, the drums would be rotated so that their neutron-absorbing sides were positioned away from the reactor and their neutron-reflecting sides positioned towards the reactor and the power allowed to rise. Once the desired power level has been attained, the drums are returned to their original positions less feedback effects. The reactor will then continue to operate at the new higher output level. Normally, because of the nuclear reactor dynamics to be discussed in more detailed below, the direction of control rod movement or the change in concentration of the chemical, such as boric acid, or the rotational movement of the drums must be reversed before the new power level has been attained. Moreover, this reversal is usually not accomplished as one continuous movement but in a series of short reversals interrupted by intervals in which the rod position or chemical concentration or drum orientation is kept constant. Once the reversal in the direction of rod travel or the change in chemical concentration or the change in drum orientation has been initiated, the power may continue to build up but at a slower rate. If the changes are performed properly, the power level will climb to the desired new operating level without overshoot or undershoot. At the present time decisions concerning control mechanism reversal are made by the licensed reactor operator based on knowledge of the dynamics of the reactor and the experience of the operator. These decisions are complicated because (1) the equations of reactor dynamics are non-linear, (2) the rate of change of power depends on both the net change in the control mechanism's position, concentration, or orientation and on its rate of change, (3) there are feedback effects between the reactor power and the rate at which power is changing, and (4) control mechanisms have non-linear strengths and finite speeds.

Recently, a methodology has been demonstrated (U.S. Ser. No. 633,939 filed July 24, 1984 and U.S. Ser. No. 907,048 filed Sept. 12, 1986) that provides a closed-loop control system for regulating reactor power which results in the attainment of new power levels without overshoot. That methodology which is referred to as the 'Reactivity Constraint Approach' is a two-part process involving a supervisory controller and an associated control law. The invention disclosed herein pertains to the development and demonstration of a closed-loop control law that is compatible with the 'Reactivity Constraint Approach' and which permits the reactor power to be adjusted in minimum time.

It is therefore an object of this invention to provide a closed-loop control law for regulating reactor power in a nuclear reactor.

It is a further object of the invention to provide such a closed-loop law which results in the attainment of new power levels without overshoot (or conversely, undershoot) beyond that allowed by specified tolerance bands.

It is yet another object of the invention to provide such a closed-loop control law which when applied to reactors that are subject to a limitation on the maximum allowed rate of change of power results in the attainment of new power levels in minimum time.

Still another object of the invention is a closed-loop control law that is compatible with the 'Reactivity Constraint Approach' as described by U.S. Ser. Nos. 633,939 and 907,048.

Yet another object of the invention is a closed-loop control law which recognizes that reactor dynamics are non-linear, that the rate of change of reactor power depends both on the net reactivity and the rate of change reactivity, that the reactivity is dependent on the reactor power through various feedback mechanisms, and that control mechanisms have finite speeds as well as position-dependent, non-linear worths.

SUMMARY OF THE INVENTION

These and other objects of the invention are achieved by means of an automatic control system including apparatus for moving a fast-acting control element such as a control rod or for changing the orientation of a rotating drum for altering the power level in a nuclear reactor. (Note: The objects of the invention could also be achieved by means of adjusting the concentration of a soluble neutron absorber (chemical shim) provided such adjustments could be accomplished with the requisite speed.) Motion of a control element or change in the orientation of a drum alters the rate of change of reactivity within the reactor. A computer, preferably a digital computer, is provided to compute repeatedly at intervals, the function $$\dot{\rho}(t) = (\bar{\beta} - \rho(t))\omega(t) - \lambda_e'(t)\rho(t) - \Sigma\bar{\beta}_i(\lambda_i - \lambda_e'(t)) + l^* \cdot \dot{\omega}(t) + l^*(\omega(t)^2 + \lambda_e'(t)\omega(t))$$

This function is based on the alternate formulation of the dynamic period equation. It provides the rate of change of reactivity that is necessary to produce a specified, constant reactor period. Adjustments in reactor power are accomplished by repeatedly solving for the required rate of change of reactivity and then adjusting the motion of the control mechanism or the change in orientation of the drums so as to provide the rate of change of reactivity specified by the function. This control method results in the attainment of the new power level in minimum time and without overshoot (or conversely undershoot) beyond that allowed by specified tolerance bands.

A similar control law based on the standard formulation of the dynamic period equation has also been developed and used as part of the invention disclosed herein.

BRIEF DESCRIPTION OF THE DRAWING

The invention disclosed herein will be understood better with reference to the drawing of which:

FIG. 1 is a graph of an experimental study showing the power and reactivity profiles obtained when using the control law disclosed herein to raise power on a constant 600 second period;

FIG. 2 is a graph showing the behavior of some of the component terms of the control law for the experimentation given in FIG. 1;

FIG. 3 is a schematic illustration of a physical implementation of the controller disclosed herein;

FIG. 4A is a schematic block diagram of the alternate version of the closed-loop control law disclosed herein;

FIG. 4B is a schematic block diagram of the standard version of the closed-loop control law disclosed herein;

FIG. 5 is a graph of a simulation study comparing the power profiles obtained when using two versions of the control law disclosed herein to raise power on a constant 0.3 second period.

DESCRIPTION OF THE PREFERRED EMBODIMENT

As an aid to understanding the present invention, a brief discussion of the underlying theory will now be given. First of all, the non-linear digital control law disclosed herein applies to reactors that can be described by the point kinetics equations. These equations are useful for describing reactors that have either close-coupled cores or cores characterized by long mean free paths for neutron diffusion. Such reactors include research and test reactors, small to mid-size commercial reactors including modular reactors, graphite-moderated reactors, and reactors for spacecraft. In addition, the control law described herein applies to reactors which, when on rapid transients, can be treated as if governed by point kinetics. Also, the control law described herein applies to large, light-water reactors when operating at power levels above that at which criticality was attained but below that at which significant reactivity feedback is present. (Note: The latter power level is typically 1–10% of rated.)

The point kinetics equations are cumbersome to use for control purposes because they are written in terms of neutron and precursor concentrations, neither of which is readily measurable. Accordingly, it is more useful to combine these two point kinetics equations to obtain either the standard or the alternate dynamic period equations which describe the reactor kinetics in terms of power, period, reactivity, and rate of change of reactivity. The alternate dynamic period equation is:

$$\tau(t) = \frac{\overline{\beta} - \rho(t) + l^*(\dot{\omega}(t)/\omega(t) + \omega(t) + \lambda'_e(t))}{\dot{\rho}(t) + \lambda'_e(t)\rho(t) + \Sigma\beta_i(\lambda_i - \lambda'_e(t))} \quad (1)$$

$$A(t) = \int_0^t d\sigma/\tau(\sigma)$$

$$P(t) = P_o e^{A(t)}$$

where $\tau(t)$ is the dynamic reactor period, $\overline{\beta}$ is the effective delayed neutron fraction, $\rho(t)$ is the net reactivity, $l^*$ is the prompt neutron lifetime, $\omega(t)$ is the inverse of the dynamic reactor period, $\dot{\omega}(t)$ is the rate of change of the inverse of the dynamic reactor period, $\dot{\rho}(t)$ is the rate of change of the net reactivity, $\lambda_e'(t)$ is the alternate multi-group decay parameter, $\lambda_i$ is the decay constant of the ith precursor group, $P_o$ is the initial power level, and $P(t)$ is the current power level.

These terms may be defined as:

(a) Period—The time required for the reactor power to increase by a factor of "e" or 2.718.

(b) Reactivity—The fractional change in the neutron population per neutron generation. (Note: The term "generation" is artificial but nevertheless useful to an initial explanation of reactivity. Neutrons are produced at high energy by fission. They must (1) decrease their energy and (2) diffuse through the reactor core before they can be absorbed in uranium and cause fissions. The time required for a neutron to complete the cycle (birth, energy decrease, diffusion, absorption) is the generation time. The generation time is denoted by the symbol $l^*$.

(c) Asymptotic Period—The period that a reactor ultimately attains in the presence of constant reactivity. This is the period associated with the well-known in-hour equation.

(d) Dynamic Period—The period that exists in the presence of changing reactivity. This is the period associated with the dynamic period equation, either standard or alternate formulation.

(e) Reactivity Balance—Many physical phenomena may affect the reactivity. These include the control mechanisms that are used to initiate power changes, the temperature of the reactor's moderator, the temperature of the coolant, the fuel temperature, the void fraction in the coolant, and certain fission products including xenon and samarium. The effect of each of these factors can be determined by using known combinations of theoretical and empirical techniques. The total reactivity present as a function of time can be determined by summing the reactivities associated with each factor relative to some initial condition, usually an exactly critical reactor. Such a calculation is referred to as a reactivity balance.

(f) Net Reactivity—The net reactivity is the total reactivity present. This quantity is the end product of a reactivity balance calculation. The net reactivity includes both the reactivity due to movement of the control mechanisms and the reactivity due to feedback.

(g) Multi-Group Decay Parameter—There are several types of neutrons in a nuclear reactor including prompt, delayed, and source neutrons. The generation time for the prompt ones is on the order of 100 microseconds. [Note: Values of the prompt lifetime may vary by many orders of magnitude depending on the reactor type.] The delayed neutrons are usually characterized as belonging to one of six distinct groups. Each group has a characteristic half-life and decay constant. There are also several independent groups of source neutrons. The equations of reactor dynamics become mathematically tractable if they are written in terms of a time-dependent, multi-group decay parameter instead of different decay constants for each group of delayed and/or source neutrons. This multi-group decay parameter is a weighted average of each of the delayed and source group's physical decay constant.

(h) Effective Delayed Neutron Fraction—The fraction of thermalized (low energy) neutrons that originated as delayed neutrons.

(i) Prompt Neutron—A neutron produced directly by the fission process.

(j) Delayed Neutron—A neutron produced following the radioactive decay by beta particle emission of a fission product. Fission products that undergo this process are called precursors. It is generally accepted that there are six distinct groups of precursors, one for each group of delayed neutrons.

The alternate effective, multi-group decay parameter $\lambda_e'(t)$ is time-dependent and is defined in terms of precursor concentrations rather than precursor yields. Specifically, $$\lambda'_e(t) = \sum_{i=1}^{N} \lambda_i^2 C_i(t) / \Sigma \lambda_i C_i(t) \quad (2)$$

where N is the total number of delayed and source neutron groups. This approach is desirable because the relative concentrations of the various delayed neutron precursor and source groups change depending on whether power is being increased or decreased.

The quantity $1^*[\dot{\omega}/\omega + \omega + \lambda_e']$ is referred to here as the alternate prompt term. It is usually small in magnitude and may be neglected for most applications However, relative to the invention disclosed herein, this quantity should be retained. This is particularly true if either the reactor power is to be changed on a short period (10 seconds or less) or if the prompt neutron lifetime is appreciable.

The dynamic period equation may also be written in its standard formulation, shown here with prompt terms. That relationship is:

$$\tau(t) = \frac{\bar{\beta} - \rho(t) + l^*\left[\frac{\dot{\omega}(t)}{\omega(t)} + \omega(t) + \lambda_e(t) - \frac{\dot{\lambda_e}(t)}{\lambda_e(t)}\right]}{\dot{\rho}(t) + \lambda_e(t)\rho(t) + \frac{\dot{\lambda_e}(t)}{\lambda_e(t)}(\bar{\beta} - \rho(t))} \quad (3)$$

$$A(t) = \int_0^t d\sigma/\tau(\sigma)$$

$$P(t) = P_o e^{A(t)}$$

where $\lambda_e(t)$ is the standard, effective, multi-group decay parameter and is defined as:

$$\lambda_e(t) = \Sigma \lambda_i C_i(t)/\Sigma C_i(t)$$

Relative to the design of closed-loop control laws for nuclear reactors, the conventional approach is to utilize the point kinetics equations in an effort to obtain specific power and reactivity profiles. The approach taken here is different because it recognizes that the rate of change of reactivity, rather than the reactivity itself, is the determining factor in controlling the reactor power. Hence, in addition to being more tractable than the point kinetics equations, the dynamic period equations, either standard or alternate, provide a more logical basis for control work because they relate rate of change of power to rate of change of reactivity.

The conventional approach to adjustments of reactor power is to gradually add reactivity to create a reactor period, allow power to rise on that period, and then to gradually remove the reactivity thereby lengthening the period and leveling the power without overshoot. This process does not achieve a minimum time response because the rate of change of reactor power will be less than the maximum allowed during the intervals of reactivity insertion and removal.

Relative to the design of minimum time control laws for nuclear reactors, it is recognized that much theoretical work has been performed in this field by applying the concepts of 'time-optimal' control. (No implementations of this approach have been made in the United States.) In general, this approach consists of:

(1) Developing a set of equations that accurately models the reactor.

(2) Specifying a performance criteria that minimizes (or maximizes) some aspect of the reactor's behavior.

(3) Applying the conditions for optimality such as those developed by the mathematician Pontryagin.

(4) The result of step (3) is a set of partial differential equations with split boundary conditions. These must be solved iteratively using complex numerical methods. Often the solution can only be obtained if the equations that describe the reactor are first linearized.

(5) The result of step (4) is a sequence of control signals, not a control law. This sequence is suitable only for the model selected in step (1) and the boundary conditions assumed in step (4). In general, these control sequences can not be modified by real-time feedback.

The invention disclosed herein does not use this approach. Rather, the invention disclosed herein results in a general purpose control law that incorporates real-time feedback.

A control law that changes the reactor power in minimum time can be obtained by exploiting the balance between prompt and delayed effects so as to create a 'constant period' controller. For example, the period is initially at infinity with the reactor at steady-state at some power. The period is stepped to its allowed value, held at that value until the power attains the desired value, and then stepped back to infinity. This is accomplished by initiating the transient with a very high rate of change of reactivity (prompt effect) and then cutting back on that rate as the delayed effects build in. The governing equation is:

$$\dot{\rho}(t) = (\bar{\beta} - \rho(t))\omega(t) - \lambda_e'(t)\rho(t) - \Sigma\bar{\beta_i}(\lambda_i - \lambda_e'(t)) + l^*\dot{\omega}(t) + l^*[(\omega(t))^2 + \lambda_e'(t)\omega(t)] \quad (4)$$

This is based on the alternate formulatin of the dynamic period equation. Symbols are defined as:

$\omega(t)$ is the inverse of the required average reactor period, $\dot{\omega}(t)$ is the rate of change of the inverse of the required average period $l^*$ is the prompt neutron lifetime $\bar{\beta}$ is the effective delayed neutron fraction, $\rho(t)$ is the net reactivity, $\dot{\rho}(t)$ is the required rate of change of the reactivity, $\lambda_e'(t)$ is the alternate effective, multi-group decay parameter, $\lambda_i$ is the decay constant of the ith precursor group, $C_i(t)$ is the concentration of the ith precursor group, and $\bar{\beta_i}$ is the effective delayed neutron fraction of the ith precursor group.

A similar relation may also be derived from the standard dynamic period equation. The governing equation is:

$$\dot{\rho}(t) = (\bar{\beta} - \rho(t))\omega(t) - \lambda_e(t)\rho(t) - (\dot{\lambda_e}(t)/\lambda_e(t))(\bar{\beta} - \rho(t)) + l^*\dot{\omega}(t) + l^*[(\omega(t))^2 + \lambda_e(t)\omega(t) - (\dot{\lambda_E}(t)/\lambda_e(t))\omega(t)] \quad (5)$$

Symbols are defined as above except that:
$\lambda_e(t)$ is the standard effective, multi-group decay parameter, and
$\dot{\lambda}_e(t)$ is the rate of change of the standard, effective, multi-group decay parameter.

Similarly, the term $l^*[\omega^2 + \lambda_e\omega + (\dot{\lambda}_e/\lambda_e)\omega]$ is referred to here as the standard prompt term and, in a preferred embodiment, should be retained even though it is normally small in magnitude.

The presence of the term $l^*\dot{\omega}(t)$ in the two control laws (equations 4 and 5) warrants discussion. Ideally, the change in $\omega(t)$ should occur as a step. However, the presence of the $l^*\dot{\omega}(t)$ term shows that this is not physically possible. Examination of equations 4 and 5 shows that the immediate effect of a step change in $\dot{\rho}(t)$ is a corresponding step change in $\dot{\omega}(t)$. As a result, the quantity $\omega(t)$ readjusts on a rapid exponential to its specified value. Relative to the control laws, the quantity $\dot{\omega}(t)$ is determined from the expression:

$$\dot{\omega}(t) = [\omega(t) - 1/\tau]/[n(\Delta t)] \quad (6)$$

where $\tau$ is the measured reactor period, $\Delta t$ is the sample interval, and n is the number of sample intervals permitted for $\omega(t)$ to attain its specified value. Given that the quantity $n(\Delta t)$ can be made small, changes in $\omega(t)$ can be made to occur sufficiently rapidly (a hundredth of a second) so as to occur essentially as a step.

The sequence of control signals is determined in the following manner:

(1) Knowing the current power, the desired power, and the specified response time, the required average reactor period is determined.
(2) Attainment and maintenance of that average required period is the objective of the control law.
(3) The time allowed to attain this desired period is specified. This is usually taken as one sampling interval.
(4) Knowing the current period, the required average period, and the allowed time to attain that period, the rate of change of the inverse of the required average period ($\omega$) is calculated using equation (6).
(5) Equation (4) is solved to obtain the rate of change of reactivity necessary to establish the specified period.
(6) The control mechanism is moved so as to provide the needed rate of change of reactivity. As a result, the period changes from infinity to the value specified in the number of sampling intervals specified from step (3). (Note: Given that the sampling interval associated with a digital computer can be extremely small (i.e., 0.01 second) the change in the period occurs essentially as a step.)
(7) The reactivity, decay parameter, and period are either measured or calculated in order to update each term in the control law.
(8) Equation (4) is solved to obtain the rate of change of reactivity necessary to *maintain* the specified period. The control mechanism is then moved at this rate.
(9) Steps (7) and (8) are repeated until the reactor power attains the desired level.
(10) The desired, average period is then set to infinity (i.e., zero rate of change of power).
(11) Steps (3)–(5) are then repeated to obtain the rate of change of reactivity necessary to drive the period to infinity.
(12) The control mechanism is moved so as to provide the needed rate of change of reactivity. As a result, the period moves back to infinity in the specified number of sampling intervals. Again, this occurs essentially as a step.
(13) Steps (7) and (8) are repeated for as long as it is necessary to hold power constant.

The same procedure is used with the control law given by equation (5).

Equations (4) and (5) are suitable for use with any desired average reactor period including ones that are as short as a few tenths of a second. If relatively long periods (i.e., slow rates of power increase) such as occur for periods of longer than 10 seconds are desired, then equations (4) and (5) may be simplified by omitting the terms that contain the prompt neutron lifetime. The resulting alternate equation is:

$$\dot{\rho}(t) = (\bar{\beta} - \rho(t))\omega(t) - \lambda_e'(t)\rho(t) - \Sigma\beta_i(\lambda_i - \lambda_e'(t)) \quad (7)$$

A similar relation may be derived from the standard formulation of the dynamic period equation. So doing yields:

$$\dot{\rho}(t) = (\bar{\beta} - \rho(t))\omega(t) - \lambda_e(t)\rho(t) - (\dot{\lambda}_e(t)/\lambda_e(t))(\bar{\beta} - \rho(t)) \quad (8)$$

The procedure used to implement equations (7) and (8) is the same as that given above except that the determination of the rate of change of the inverse of the required average period is omitted. FIGS. One and Two illustrate the approach for an actual power increase of 100 Kw on a research reactor. The specified constant period was 600 seconds. The period was stepped to this value by initially specifying a rate of reactivity insertion of about 1.7 millibeta per second. Then as the delayed terms grew in magnitude, the rate of change of reactivity was reduced. On reaching full power, the rate of change of reactivity was made negative, the period stepped back to infinity, and the power increase stopped. Because the reactor period was maintained constant at 600 seconds for the entire transient, the power change was accomplished in the minimum time possible for a reactor limited to a 600 second period. As proof of this note that the initial and final power levels were 992 and 1100 Kw. Hence, from the definition of reactor period, the minimum possible transit time was:

$$\Delta t = \tau \ln(P_F/P_o)$$
$$= 600 \ln(1100/992)$$
$$= 62 \text{ seconds}$$

Note that this time is in excellent agreement with that obtained from the experimental trial as shown in FIG. 1. This transient ran under the MIT-CSDL Non-Linear Digital Controller (NLDC) which is the implementing algorithm for the 'Reactivity Constraint Approach' as described in U.S. Ser. Nos. 633,939 and 907,048. That is, the NLDC was monitoring the transient. The NLDC did not intervene indicating that control remained feasible at all times because the available rate of change of reactivity was always adequate for halting the transient. Hence, the control law was compatible with the 'Reactivity Constraint Approach'. FIG. One shows the power and reactivity profiles. Note that there was no power overshoot. FIG. Two shows the behavior of the terms that comprise the control law and which were dominant during this experimentation. Note that the control signal which is the required rate of change of reactivity was changed discontinuously both at the start of the transient and again when the reactor power attained its specified value. As a result, the reactor period changed rapidly (within one sampling interval) from infinity to 600 seconds at the outset of the transient and from 600 seconds to infinity at the termination of the transient. Also note that the maximum required rate of change of reactivity occurred at the outset of the transient. Hence, the available rate of change of reactivity always exceeds the magnitude of the delayed neutron effects as required by the 'Reactivity Constraint Approach'.

FIG. 3 is a schematic illustration of a physical implementation of the control law disclosed herein. A digital computer 30 will compute the control law (equation (4) or (5) or both) at time intervals such as 0.01–1.0 second using as inputs the parameters shown in block 38. This computer will also calculate the supervisory algorithm used for the 'Reactivity Constraint Approach'. The output of the computer 30 is used to control a variable speed drive motor 32 which is arranged to advance or retract a rotating drum or control rod 34 with respect to a reactor core 36.

FIG. 4A is an expanded schematic diagram of the alternate constant period control law (equation (4)) contained in block 30 of FIG. 3. Block 4 is a real-time model of the delayed neutron precursor groups. It is used to obtain the effective, multi-group decay parameter. Block 6 is a reactivity meter and/or a means of calculating reactivity via a balance. Block 8 represents the determination of the required average period. If the power is not within a permitted deadband about the desired value, the required period is the limiting allowed period. If power is within the permitted deadband, the required period is set to infinity (i.e., zero rate of change of power). Blocks 10 and 12 denote the information necessary to determine the rate of change of the period. The output of each of these blocks (numbers 4, 6, 8, 10, and 12) are the time-dependent quantities required by the constant period control law. These quantities are then multiplied by various physical constants and summed to yield the required rate of change of reactivity, block 14. This is then compared to the differential reactivity worth of the control mechanism (block 2) and the required speed of the control device is determined, block 16. The output of block 16 is the control signal to block 32, the variable speed motor that drives the control device.

FIG. 4B is an expanded schematic diagram of the standard constant period control law (equation (5)) contained in block 30 of FIG. 3. Block 20 is a real-time model of the delayed neutron precursor groups. It is used to obtain the effective, multi-group decay parameter. Block 22 is a reactivity meter and/or a means of calculating reactivity via a balance. Block 24 represents the determination of the required average period. If the power is not within a permitted deadband about the desired value, the required period is the limiting allowed period. If power is within the permitted deadband, the required period is set to infinity (i.e., zero rate of change of power). Blocks 26 and 28 denote the information necessary to determine the rate of change of the period. The output of each of these blocks (numbers 20, 22, 24, 26, and 28) are the time-dependent quantities required by the constant period control law. These quantities are then multiplied by various physical constants and summed to yield the required rate of change of reactivity, block 14. This is then compared to the differential reactivity worth of the control mechanism (block 2) and the required speed of the control device is determined, block 16. The output of block 16 is the control signal to block 32, the variable speed motor that drives the control device.

FIG. 5 is a graph that shows the results of a simulation study in which a power increase was accomplished on a very short period. Shown are two power profiles. The first is the one obtained by using the control law given by either equation (4) or (5) which include the prompt terms. The second is the one obtained by using either equation (7) or (8) which omit the prompt terms. The profile obtained with the law that included the prompt terms shows that power rose on the specified period and leveled off within the allowed band. The profile obtained with the law that excluded the prompt terms shows that power rose more slowly than specified and that there was a significant overshoot. Comparison of these two power profiles shows the importance of including the prompt terms in the control law if transients are to be conducted on short periods.

The advantages to these 'constant period' control laws are that:

(1) The required average period can be set to the limiting allowed period and held at that value for the entire transient. Thus, changes in reactor power are accomplished in minimum time.

(2) The control law is compatible with the 'Reactivity Constraint Approach'. Specifically, the maximum prompt effect which is the largest required rate of reactivity change occurs at the outset of the transient. Hence, the available prompt effect always exceeds the delayed effects and the transient can be stopped on demand. This means that there will be no power overshoots or conversely undershoots.

(3) These laws are general-purpose, closed-form expressions suitable for use on many differing types of reactors and with any set of boundary conditions.

(4) The resulting power trajectory is readily determined because the period is a constant. This should facilitate coordination of heat removal systems with energy production.

(5) Both the targeted power and period are known. So, there are two quantities to be used for feedback of the conventional type in which the product of a gain and an error between the actual and specified parameters is used to improve system response.

It is thus seen that the objects of this invention have been achieved in that there has been disclosed the apparatus and method for the closed-loop control of nuclear reactor power. The disclosed control law has resulted in a general method that permits changes in the reactor power to be accomplished in minimum time. Furthermore, the controller is capable of raising and lowering power in a safe, efficient manner without power overshoots (or conversely, undershoots). It is recognized that modifications and variations will occur to those skilled in the art and it is intended that all such modifications and variations be included within the scope of the appended claims.

What is claimed is:

1. Apparatus for closed-loop control of reactor power in a nuclear reactor in which power level is altered by adjustments in the rate of change of reactivity comprising:

means for adjusting said rate of change of reactivity; and computing apparatus for computing repeatedly at intervals the function $\dot{\rho}(t)=(\overline{\beta}-\rho(t))\omega(t)-\lambda_e'(t)\rho(t)-\Sigma\overline{\beta_i}(\lambda_i-\lambda_e'(t))+1^*\omega(t)+1^*[(\dot{\omega}(t))^2+\lambda_e'(t)\omega(t)]$; whereby the reactor period is maintained at a specified constant value by adjusting said rate of change of reactivity to equal the value of the function.

2. The apparatus of claim 1 wherein said means for adjusting rate of change of reactivity includes apparatus for moving a control element.

3. The apparatus of claim 1 wherein said means for adjusting rate of change of reactivity includes apparatus for changing the orientation of a rotating drum.

4. The apparatus of claim 1 wherein said interval is of the order of 0.01–1.0 seconds.

5. Method for closed-loop control of reactor power in a nuclear reactor in which power level is altered by adjustments in the rate of change of reactivity comprising:

computing repeatedly at intervals the function $\dot{\rho}(t)=(\overline{\beta}-\rho(t))\omega(t)-\lambda_e'(t)\rho(t)-\Sigma\overline{\beta_i}(\lambda_i-\lambda_e'(t))+1^*\omega(t)+1^*[(\dot{\omega}(t))^2+\lambda_e'(t)\omega(t)]$ and adjusting said rate of change of reactivity to equal the value of the function so as to maintain a specified constant reactor period.

6. The method of claim 5 wherein said interval is on the order of 0.01–1.0 seconds.

7. Apparatus for closed-loop control of reactor power in a nuclear reactor in which power level is altered by movement of a control element comprising: apparatus for moving said control element; and computing apparatus for computing repeatedly at intervals the function $\rho(t)=(\overline{\beta}-\rho(t))\omega(t)-\lambda_e'(t)\rho(t)-\Sigma\overline{\beta_i}(\lambda_i-\lambda_e'(t))+1^*\omega(t)+1^*[(\omega(t))^2+\lambda_e'(t)\omega(t)]$; whereby the direction of motion of said control element is altered so that the rate of change of reactivity equals the value of the function.

8. Apparatus of claim 7 wherein said interval is of the order of 0.01–1.0 seconds.

9. Apparatus of claim 7 wherein said control element is a control rod.

10. Apparatus of claim 7 wherein said control element is a shim blade.

11. Method for closed-loop control of reactor power in a nuclear reactor in which power level is altered by movement of a control element comprising:

computing repeatedly at intervals the function $\dot{\rho}(t)=(\overline{\beta}-\rho(t))\omega(t)-\lambda_e'(t)\rho(t)-\Sigma\overline{\beta_i}(\lambda_i-\lambda_e'(t))+1^*\omega(t)+1^*[(\dot{\omega}(t))^2+\lambda_e'(t)\omega(t)]$; and altering the direction of the motion of said control element so that the rate of change of reactivity equals the value of the function.

12. The method of claim 11 wherein said interval is of the order of 0.01–1.0 seconds.

13. Apparatus for closed loop control of reactor power in a nuclear reactor in which power level is altered by adjustment of the orientation of a rotating drum comprising:

apparatus for changing the orientation of said rotating drum; and
computing apparatus for computing repeatedly at intervals the function $\dot{\rho}(t)=(\overline{\beta}-\rho(t))\omega(t)-\lambda_e'(t)\rho(t)-\Sigma\overline{\beta_i}(\lambda_i-\lambda_e'(t))+1^*\omega(t)+1^*[(\dot{\omega}(t))^2+\lambda_e'(t)\omega(t)]$; whereby the orientation of said rotating drum is altered so that the rate of change of reactivity equals the value of the function.

14. The apparatus of claim 13 wherein said interval is of the order of 0.01–1.0 seconds.

15. Method for closed-loop control of reactor power in a nuclear reactor in which power level is altered by adjustment of the orientation of a rotating drum comprising:

computing repeatedly at intervals the function $\dot{\rho}(t)=(\overline{\beta}-\rho(t))\omega(t)-\lambda_e'(t)\rho(t)-\Sigma\overline{\beta_i}(\lambda_i-\lambda_e'(t))+1^*\omega(t)+1^*[(\dot{\omega}(t))^2+\lambda_e'(t)\omega(t)]$; and adjusting the orientation of said rotating drum so that the rate of change of reactivity equals the value of the function.

16. The method of claim 15 wherein said interval is of the order of 0.01–1.0 seconds.

17. Apparatus for closed-loop control of reactor power in a nuclear reactor in which power level is altered by adjustments in the rate of change of reactivity comprising:

means for adjusting said rate of change of reactivity; and
computing apparatus for computing repeatedly at intervals the function $\dot{\rho}(t)=(\overline{\beta}-\rho(t))\omega(t)-\lambda_e(t)\rho(t)-(\dot{\lambda}_e(t)/\lambda_e(t))(\overline{\beta}-\rho(-t))+1^*\omega(t)+1^*[(\omega(t))^2+\lambda_e(t)\omega(t)-(\dot{\lambda}_e(t)/\lambda_e(t))\omega(t)]$; whereby the reactor period is maintained at a specified constant value by adjusting said rate of change of reactivity to equal the value of the function.

18. The apparatus of claim 17 wherein said means for adjusting rate of change of reactivity includes apparatus for moving a control element.

19. The apparatus of claim 17 wherein said means for adjusting rate of change of reactivity includes apparatus for changing the orientation of a rotating drum.

20. The apparatus of claim 17 wherein said interval is of the order of 0.01–1.0 seconds.

21. Method for closed-loop control of reactor power in a nuclear reactor in which power level is altered by adjustments in the rate of change of reactivity comprising:

computing repeatedly at intervals the function $\dot{\rho}(t)=(\overline{\beta}-\rho(t))\omega(t)-\lambda_e(t)\rho(t)-(\dot{\lambda}_e(t)/\lambda_e(t))(\overline{\beta}-\rho(-t))+1^*\dot{\omega}(t)+1^*[(\omega(t))^2+\lambda_e(t)\omega(t)-(\dot{\lambda}_e(t)/\lambda_e(t))\omega(t)]$ and adjusting said rate of change of reactivity to equal the value of the function so as to maintain a specified constant reactor period.

22. The method of claim 21 wherein said interval is on the order of 0.01–1.0 seconds.

23. Apparatus for closed-loop control of reactor power in a nuclear reactor in which power level is altered by movement of a control element comprising:

apparatus for moving said control element; and computing apparatus for computing repeatedly at intervals the function $\dot{\rho}(t)=(\overline{\beta}-\rho(t)\dot{\omega}(t)-\lambda_e(t)\rho(t)-(\lambda_e(t)/\lambda_e(t))(\overline{\beta}-\rho(t-))+1^*\omega(t)+1^*[(\omega(t))^2+\lambda_e(t)\omega(t)+(\dot{\lambda}_e(t)/\lambda_e(t))\omega(t)]$; whereby the direction of motion of said control element is altered so that the rate of change of reactivity equals the value of the function.

24. Apparatus of claim 23 wherein said interval is of the order of 0.01–1.0 seconds.

25. Apparatus of claim 23 wherein said control element is a control rod.

26. Apparatus of claim 23 wherein said control element is a shim blade.

27. Method for closed-loop control of reactor power in a nuclear reactor in which power level is altered by movement of a control element comprising:

computing repeatedly at intervals the function
$\dot{\rho}(t)=(\overline{\beta}-\rho(t))\omega(t)-\lambda_e(t)\rho(t)-(\dot{\lambda}_e(t)/\lambda_e(t))(\overline{\beta}-\rho(t))+l^*\dot{\omega}(t)+l^*[(\omega(t))^2+\lambda_e(t)\omega(t)-(\dot{\lambda}_e(t)/\lambda_e(t))\omega(t)]$; and altering the direction of the motion of said control element so that the rate of change of reactivity equals the value of the function.

28. The method of claim 27 wherein said interval is of the order of 0.01-1.0 seconds.

29. Apparatus for closed loop control of reactor power in a nuclear reactor in which power level is altered by adjustment of the orientation of a rotating drum comprising:
apparatus for changing the orientation of said rotating drum; and
computing apparatus for computing repeatedly at intervals the function
$\dot{\rho}(t)=(\overline{\beta}-\rho(t))\omega(t)-\lambda_e(t)\rho(t)-(\dot{\lambda}_e(t)/\lambda_e(t))(\overline{\beta}-\rho(t))+l^*\dot{\omega}(t)+l^*[(\omega(t))^2+\dot{\lambda}_e(t)\omega(t)-(\dot{\lambda}_e(t)/\lambda_e(t))\omega(t)]$; whereby the orientation of said rotating drum is altered so that the rate of change of reactivity equals the value of the function.

30. The apparatus of claim 29 wherein said interval is of the order of 0.01-1.0 seconds.

31. Method for closed-loop control of reactor power in a nuclear reactor in which power level is altered by adjustment of the orientation of a rotating drum comprising:
computing repeatedly at intervals the function
$\dot{\rho}(t)=(\overline{\beta}-\rho(t))\omega(t)-\lambda_e(t)\rho(t)-(\lambda_e(t)/\lambda_e(t))(\overline{\beta}-\rho(t))+l^*\dot{\omega}(t)+l^*[(\omega(t))^2+\lambda_e'(t)\omega(t)-(\dot{\lambda}_e(t)/\lambda_e(t))\omega(t)]$; and adjusting the orientation of said rotating drum so that the rate of change of reactivity equals the value of the function.

32. The method of claim 31 wherein said interval is of the order of 0.01-1.0 seconds.

33. Apparatus for closed-loop control of reactor power in a nuclear reactor in which power level is altered by adjustments in the rate of change of reactivity comprising:
means for adjusting said rate of change of reactivity; and
computing apparatus for computing repeatedly at intervals the function
$\dot{\rho}(t)=(\overline{\beta}-\rho(t))\omega(t)-\lambda_e'(t)\rho(t)-\Sigma\overline{\beta_i}(\lambda_i-\lambda_e'(t))$;
whereby the reactor period is maintained at a specified constant value by adjusting said rate of change of reactivity to equal the value of the function.

34. Method for closed-loop control of reactor power in a nuclear reactor in which power level is altered by adjustments in the rate of change of reactivity comprising:
computing repeatedly at intervals the function
$\dot{\rho}(t)=(\overline{\beta}-\rho(t))\omega(t)-\lambda_e'(t)\rho(t)-\Sigma\overline{\beta_i}(\lambda_i-\lambda_e'(t))$ and adjusting said rate of change of reactivity to equal the value of the function so as to maintain a specified constant reactor period.

35. Apparatus for closed-loop control of reactor power in a nuclear reactor in which power level is altered by adjustments in the rate of change of reactivity comprising:
means for adjusting said rate of change of reactivity; and computing apparatus for computing repeatedly at intervals the function
$\dot{\rho}(t)=(\overline{\beta}-\rho(t))\omega(t)-\lambda_e(t)\rho(t)-(\dot{\lambda}_e(t)/\lambda_e(t))(\overline{\beta}-\rho(t))$; whereby the reactor period is maintained at a specified constant value by adjusting said rate of change of reactivity to equal the value of the function.

36. Method for closed-loop control of reactor power in a nuclear reactor in which power level is altered by adjustments in the rate of change of reactivity comprising:
computing repeatedly at intervals the function
$\dot{\rho}(t)=(\overline{\beta}-\rho(t))\omega(t)-\lambda_e(t)\rho(t)-(\dot{\lambda}_e(t)/\lambda_e(t))(\overline{\beta}-\rho(t))$ and adjusting said rate of change of reactivity to equal the value of the function so as to maintain a specified constant reactor period.

* * * * *

UNITED STATES PATENT AND TRADEMARK OFFICE
CERTIFICATE OF CORRECTION

PATENT NO. : 4,781,881
DATED : November 1, 1988
INVENTOR(S) : John A. Bernard, Jr.

It is certified that error appears in the above-identified patent and that said Letters Patent is hereby corrected as shown below:

Column 1, line 16, "rector" should be --reactor--.

Column 2, lines 53 and 54, change the equation

"$\dot{\rho}(t) = \bar{\beta} - \rho(t))\omega(t) - \lambda_e'(t)\rho(t) - \Sigma \bar{\beta}_i (\lambda_i - \lambda_e'(t)) + \ell * \omega(t) + \ell * (\dot{\omega}(t)^2 + \lambda_e'(t)\omega(t)))$" to read --$\dot{\rho}(t) = \bar{\beta} - \rho(t))\omega(t) - \lambda_e'(t)\rho(t) - \Sigma \bar{\beta}_i (\lambda_i - \lambda_e'(t)) + \ell * \dot{\omega}(t) + \ell * (\omega(t)^2 + \lambda_e'(t)\omega(t))$-- .

Column 3, lines 57 and 58, change equation (1) from $$\tau(t) = \frac{\bar{\beta} - \rho(t) + \ell*(\omega(t)/\dot{\omega}(t) + \omega(t) + \lambda'_e(t))}{\dot{\rho}(t) + \lambda'_e(t)\rho(t) + \Sigma\bar{\beta}_i(\lambda_i - \lambda'_e(t))}$$

to read $$\tau(t) = \frac{\bar{\beta} - \rho(t) + \ell*(\dot{\omega}(t)/\omega(t) + \omega(t) + \lambda'_e(t))}{\dot{\rho}(t) + \lambda'_e(t)\rho(t) + \Sigma\bar{\beta}_i(\lambda_i - \lambda'_e(t))}$$

UNITED STATES PATENT AND TRADEMARK OFFICE
CERTIFICATE OF CORRECTION

PATENT NO. : 4,781,881

DATED : November 1, 1988

INVENTOR(S) : John A. Bernard, Jr.

It is certified that error appears in the above-identified patent and that said Letters Patent is hereby corrected as shown below:

Column 6, lines 42 and 43, equation (4), change

"$\dot{\rho}(t)=(\overline{\beta}-\rho(t))\omega(t)-\lambda_e'(t)\rho(t)-\Sigma\overline{\beta}_i(\lambda_i-\lambda_e'(i))$
$+\ell*\omega(t)+\ell*[(\dot{\omega}(t))^2+\lambda_e'(t)\omega(t)]$ to read --$\dot{\rho}(t)=(\overline{\beta}-\rho(t))\omega(t)-\lambda_e'(t)\rho(t)-\Sigma\overline{\beta}_i(\lambda_i-\lambda_e'(t))$
$+\ell*\dot{\omega}(t)+\ell*[(\omega(t))^2+\lambda_e'(t)\omega(t)]$--

Column 7, line 43 "establish" should be

--<u>establish</u>--.

Column 8, line 17, equation (7), change

"$\dot{\rho}(t)=(\overline{\beta}-\rho(t))\omega(t)-\lambda_e'(t)\rho(t)-\Sigma\beta_i(\lambda_i-\lambda_e'(t))$"

to read

--$\dot{\rho}(t)=(\overline{\beta}-\rho(t))\omega(t)-\lambda_e'(t)\rho(t)-\Sigma\overline{\beta}_i(\lambda_i-\lambda_e'(t))$--

Column 11, lines 3 and 4, change the equation from

"$\dot{\rho}(t)=(\overline{\beta}-\rho(t))\omega(t)-\lambda_e'(t)\rho(t)-\Sigma\overline{\beta}_i(\lambda_i-\lambda_e'(t))$
$+\ell*\omega(t)+\ell*[(\dot{\omega}(t)^2+\lambda_e'(t)\omega(t)]$ to read --$\dot{\rho}(t)=(\overline{\beta}-\rho(t))\omega(t)-\lambda_e'(t)\rho(t)-\Sigma\overline{\beta}_i(\lambda_i-\lambda_e'(t))$
$+\ell*\dot{\omega}(t)+\ell*[(\omega(t))^2+\lambda_e'(t)\omega(t)]$--

UNITED STATES PATENT AND TRADEMARK OFFICE
CERTIFICATE OF CORRECTION

PATENT NO. : 4,781,881

DATED : November 1, 1988

INVENTOR(S) : John A. Bernard, Jr.

It is certified that error appears in the above-identified patent and that said Letters Patent is hereby corrected as shown below:

Column 11, lines 21 and 22, change the equation from

"$\dot{\rho}(t) = (\bar{\beta} - \rho(t))\omega(t) - \lambda_e'(t)\rho(t) - \Sigma\bar{\beta}_i(\lambda_i - \lambda_e'(t))$
$+ \ell * \omega(t) + \ell * [(\dot{\omega}(t))^2 + \lambda_e'(t)\omega(t)]$ to read $--\dot{\rho}(t) = (\bar{\beta} - \rho(t))\omega(t) - \lambda_e'(t)\rho(t) - \Sigma\bar{\beta}_i(\lambda_i - \lambda_e'(t))$
$+ \ell * \dot{\omega}(t) + \ell * [(\omega(t))^2 + \lambda_e'(t)\omega(t)] --$ Column 11, lines 34-35, change the equation from "$\rho(t) = (\bar{\beta} - \rho(t))\omega(t) - \lambda_e'(t)\rho(t) - \Sigma\bar{\beta}_i(\lambda_i - \lambda_e'(t))$
$+ \ell * \omega(t) + \ell * [(\omega(t))^2 + \lambda_e'(t)\omega(t)]$ to read $--\dot{\rho}(t) = (\bar{\beta} - \rho(t))\omega(t) - \lambda_e'(t)\rho(t) - \Sigma\bar{\beta}_i(\lambda_i - \lambda_e'(t))$
$+ \ell * \dot{\omega}(t) + \ell * [(\omega(t))^2 + \lambda_e'(t)\omega(t)] --$ Column 11, lines 49 and 50, change the equation from "$\dot{\rho}(t) = (\bar{\beta} - \rho(t))\omega(t) - \lambda_e'(t)\rho(t) - \Sigma\bar{\beta}_i(\lambda_i - \lambda_e'(t))$
$+ \ell * \omega(t) + \ell * [(\dot{\omega}(t))^2 + \lambda_e'(t)\omega(t)]$ to read $--\dot{\rho}(t) = (\bar{\beta} - \rho(t))\omega(t) - \lambda_e'(t)\rho(t) - \Sigma\bar{\beta}_i(\lambda_i - \lambda_e'(t))$
$+ \ell * \dot{\omega}(t) + \ell * [(\omega(t))^2 + \lambda_e'(t)\omega(t)] --$

UNITED STATES PATENT AND TRADEMARK OFFICE
CERTIFICATE OF CORRECTION

PATENT NO. : 4,781,881
DATED : November 1, 1988
INVENTOR(S) : John A. Bernard, Jr.

It is certified that error appears in the above-identified patent and that said Letters Patent is hereby corrected as shown below:

Column 11, lines 64-65, change the equation from

"$\dot{\rho}(t)=(\bar{\beta}-\rho(t))\omega(t)-\lambda_e{}'(t)\rho(t)-\Sigma\bar{\beta}_i(\lambda_i-\lambda_e{}'(t))+\ell*\dot{\omega}(t)+\ell*[(\dot{\omega}(t))^2+\lambda_e{}'(t)\omega(t)]$ to read --$\dot{\rho}(t)=(\bar{\beta}-\rho(t))\omega(t)-\lambda_e{}'(t)\rho(t)-\Sigma\bar{\beta}_i(\lambda_i-\lambda_e{}'(t))+\ell*\dot{\omega}(t)+\ell*[(\omega(t))^2+\lambda_e{}'(t)\omega(t)]$--

Column 12, lines 8-9, change the equation from

"$\dot{\rho}(t)=(\bar{\beta}-\rho(t))\omega(t)-\lambda_e{}'(t)\rho(t)-\Sigma\bar{\beta}_i(\lambda_i-\lambda_e{}'(t))+\ell*\dot{\omega}(t)+\ell*[(\dot{\omega}(t))^2+\lambda_e{}'(t)\omega(t)]$ to read --$\dot{\rho}(t)=(\bar{\beta}-\rho(t))\omega(t)-\lambda_e{}'(t)\rho(t)-\Sigma\bar{\beta}_i(\lambda_i-\lambda_e{}'(t))+\ell*\dot{\omega}(t)+\ell*[(\omega(t))^2+\lambda_e{}'(t)\omega(t)]$--

Column 12, lines 24-26 change the equation from

"$\dot{\rho}(t)=(\bar{\beta}-\rho(t))\omega(t)-\lambda_e(t)\rho(t)-(\dot{\lambda}_e(t)/\lambda_e(t))(\bar{\beta}-\rho(t))+\ell*\omega(t)+\ell*[(\omega(t))^2+\dot{\lambda}_e(t)\omega(t)-(\lambda_e(t)/\lambda_e(t))\omega(t)]$ to read --$\dot{\rho}(t)=(\bar{\beta}-\rho(t))\omega(t)-\lambda_e(t)\rho(t)-(\dot{\lambda}_e(t)/\lambda_e(t))(\bar{\beta}-\rho(t))+\ell*\omega(t)+\ell*[(\omega(t))^2+\lambda_e(t)\omega(t)-(\dot{\lambda}_e(t)/\lambda_e(t))\omega(t)]$--

UNITED STATES PATENT AND TRADEMARK OFFICE
CERTIFICATE OF CORRECTION

PATENT NO. : 4,781,881
DATED : November 1, 1988
INVENTOR(S) : John A. Bernard, Jr.

It is certified that error appears in the above-identified patent and that said Letters Patent is hereby corrected as shown below:

Column 12, lines 55-56, change the equation from

"$\dot{\rho}(t) = (\bar{\beta} - \rho(t)\dot{\omega}(t) - \lambda_e(t)\rho(t) - (\dot{\lambda}_e(t)/\lambda_e(t))(\bar{\beta} - \rho(t)) + \ell*\omega(t) + \ell*[(\omega(t))^2 + \lambda_e(t)\omega(t) - (\dot{\lambda}_e(t)/\lambda_e(t))\omega(t)]$ to read --$\dot{\rho}(t) = (\bar{\beta} - \rho(t))\omega(t) - \lambda_e(t)\rho(t) - (\dot{\lambda}_e(t)/\lambda_e(t))(\bar{\beta} - \rho(t)) + \ell*\dot{\omega}(t) + \ell*[(\omega(t))^2 + \lambda_e(t)\omega(t) - (\dot{\lambda}_e(t)/\lambda_e(t))\omega(t)]$--

Column 13, lines 2-4, change the equation from

"$\dot{\rho}(t) = (\bar{\beta} - \rho(t))\omega(t) - \lambda_e(t)\rho(t) - (\lambda'_e(t)/\lambda_e(t))(\bar{\beta} - \rho(t)) + \ell*\dot{\omega}(t) + \ell*[(\omega(t))^2 + \lambda_e(t)\omega(t) - (\lambda'_e(t)/\lambda'_e(t))\omega(t)]$ to read --$\dot{\rho}(t) = (\bar{\beta} - \rho(t))\omega(t) - \lambda_e(t)\rho(t) - (\lambda'_e(t)/\lambda_e(t))(\bar{\beta} - \rho(t)) + \ell*\dot{\omega}(t) + \ell*[(\omega(t))^2 + \lambda_e(t)\omega(t) - (\dot{\lambda}_e(t)/\lambda_e(t))\omega(t)]$--

UNITED STATES PATENT AND TRADEMARK OFFICE
CERTIFICATE OF CORRECTION

PATENT NO. : 4,781,881

DATED : November 1, 1988

INVENTOR(S) : John A. Bernard, Jr.

It is certified that error appears in the above-identified patent and that said Letters Patent is hereby corrected as shown below:

Column 13, lines 17-19, change the equation from

"$\dot{\rho}(t) = (\bar{\beta} - \rho(t))\omega(t) - \lambda_e(t)\rho(t) - (\dot{\lambda}_e(t)/\lambda_e(t))(\bar{\beta} - \rho(t)) + \ell*\dot{\omega}(t) + \ell*[(\omega(t))^2 + \dot{\lambda}_e(t)\omega(t) - (\lambda_e(t)/\dot{\lambda}_e(t))\omega(t)]$ to read --$\dot{\rho}(t) = (\bar{\beta} - \rho(t))\omega(t) - \lambda_e(t)\rho(t) - (\dot{\lambda}_e(t)/\lambda_e(t))(\bar{\beta} - \rho(t)) + \ell*\dot{\omega}(t) + \ell*[(\omega(t))^2 + \lambda_e(t)\omega(t) - (\dot{\lambda}_e(t)/\lambda_e(t))\omega(t)]$--

Column 13, lines 29-31, change the equation from

"$\dot{\rho}(t) = (\bar{\beta} - \rho(t))\omega(t) - \lambda_e(t)\rho(t) - (\lambda_e(t)/\lambda_e(t))(\bar{\beta} - \rho(t)) + \ell*\dot{\omega}(t) + \ell*[(\omega(t))^2 + \lambda_e'(t)\omega(t) - (\dot{\lambda}_e(t)/\lambda_e(t))\omega(t)]$ to read --$\dot{\rho}(t) = (\bar{\beta} - \rho(t))\omega(t) - \lambda_e(t)\rho(t) - (\dot{\lambda}_e(t)/\lambda_e(t))(\bar{\beta} - \rho(t)) + \ell*\dot{\omega}(t) + \ell*[(\omega(t))^2 + \lambda_e'(t)\omega(t) - (\dot{\lambda}_e(t)/\lambda_e(t))\omega(t)]$--

UNITED STATES PATENT AND TRADEMARK OFFICE
CERTIFICATE OF CORRECTION

PATENT NO. : 4,781,881
DATED : November 1, 1988
INVENTOR(S) : John A. Bernard, Jr.

It is certified that error appears in the above-identified patent and that said Letters Patent is hereby corrected as shown below:

Column 14, line 14, change the equation from

"$\dot{\rho}(t) = (\beta - \rho(t))\omega(t) - \lambda_e'(t)\rho(t) - \Sigma \bar{\beta}_i (\lambda_i - \lambda_e'(t))$"

to read

--$\dot{\rho}(t) = (\bar{\beta} - \rho(t))\omega(t) - \lambda_e'(t)\rho(t) - \Sigma \bar{\beta}_i (\lambda_i - \lambda_e'(t))$--

Column 14, lines 35-36, change the equation from

"$\dot{\rho}(t) = (\bar{\beta} - \rho(t))\omega(t) - \lambda_e(t)\rho(t) - (\lambda_e(t)/\dot{\lambda}_e(t))(\bar{\beta} - p(t))$"

to read

--$\dot{\rho}(t) = (\bar{\beta} - \rho(t))\omega(t) - \lambda_e(t)\rho(t) - (\dot{\lambda}_e(t)/\lambda_e(t))(\bar{\beta} - p(t))$--

Signed and Sealed this

Twentieth Day of June, 1989

*Attest:*

DONALD J. QUIGG

*Attesting Officer*  *Commissioner of Patents and Trademarks*